Oct. 3, 1961     H. J. EUWEMA     3,003,100

BATTERY EQUAL CHARGE CONTROL

Filed May 1, 1958

INVENTOR

Herman J Euwema

United States Patent Office 3,003,100
Patented Oct. 3, 1961

3,003,100
BATTERY EQUAL CHARGE CONTROL
Herman J. Euwema, Room 1568, 1440 Broadway,
New York 18, N.Y.
Filed May 1, 1958, Ser. No. 733,788
6 Claims. (Cl. 320—17)

This invention is related to systems that lower the charging rate of storage batteries when gas is evolved.

It differs from known systems of this sort most greatly in that the charging rate is lowered by connecting an electric power consuming device, which may also be an indicator, to that part of the series of cells that is evolving gas.

The instant letters are a continuation in part of my copending application Serial Number 570,445 filed March 9, 1956, now abandoned.

While preventing gassing, it exploits the excess capacity of a charging system in the latter stages of a charging operation to indicate the part of the series of cells that charges more quickly and to charge more rapidly the remaining cells.

Most of the deterioration that battery cells experience is due either to gassing in charging at too high a rate for the state of charge, or to undercharge sulphation which occurs when a cell is seldom brought up to full charge. Furthermore, gassing results in water replacement which is the chief battery maintenance effort. Because almost all batteries are composed of a multiplicity of cells connected in series, meaning that all the charging current flows through every cell, and because many charging systems charge a multiplicity of batteries so that all the charging current flows through every battery and therefore through every cell, it can be seen that any variation in the capacity of the cells to absorb a common charging current must result in deterioration of the one or other type. The smallest variation which exists in charge versus discharge efficiency of cells with a battery becomes a variation in the capacity to absorb a charging current. This latter variation, in the state of the art heretofore, widens with time due to these opposite deteriorations until failure occurs. Variations which exist between several batteries presented to the same charging current are usually quite large due to differences in age, construction, and state of discharge of each.

If one cell or part of a series of cells is being charged at too high a current, it will gas, and if a power consuming device is connected across this part of the series, it will happen both that more current will flow through the remaining cells to approach the maximum current they can absorb, and also that the current through the gassing part of the series can be diminished to or to less than the amount it can absorb without gassing, as the excess will be shunted through the power consuming device.

One useful embodiment of this invention, and the one preferred, will have an automatic switch in each cell of a battery responding to the evolved gas pressure of a closed chamber containing the electrolyte and acting to connect a light bulb to the terminals of the cell containing it. Another useful embodiment will respond to the gassing state of one representative cell of a battery and connect the two terminals of the total number of cells of which it is representative to a power consuming device while this group of similar cells is connected in series with other batteries when being charged.

Figure 1:
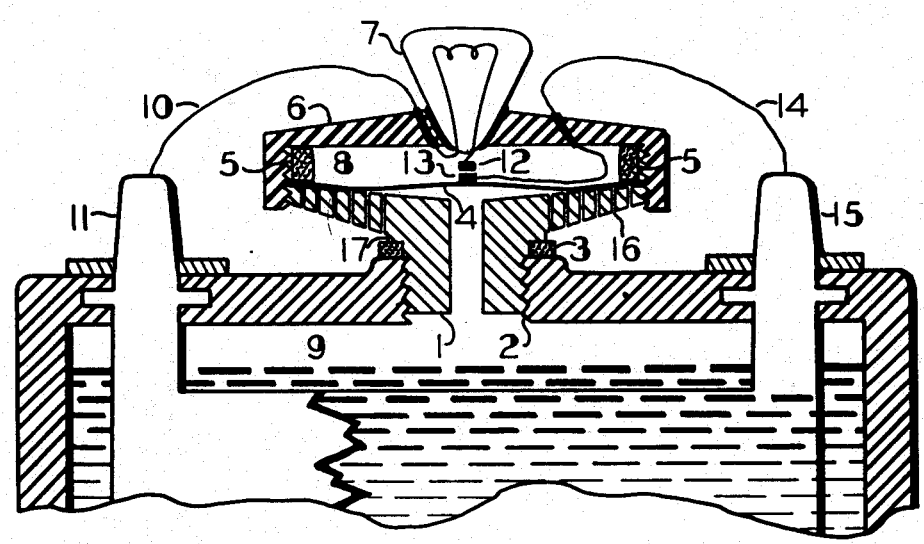
FIGURE 1 shows a vertical section of a circular device in control of a single cell.

In FIGURE 1, the lower piece 1 is screwed into the battery filler hole 2 in place of the usual battery cap, making an airtight seal by means of washer 3. The lower piece 1 is slightly saucer shaped on its upper surface and is surmounted by a thin, flexible, and slack circular or saucer shaped diaphragm 4 of rubber-like material which is held in place at its periphery by an easily compressible washer 5 over which the cover 6 is screwed to the lower piece. The cover contains the power consuming light bulb 7 cemented to it. The chamber 8 above the diaphragm has no connection for circulation with either the chamber 9 above the battery electrolyte or with the atmosphere exterior to the battery, and thus corrosion of the metal elements within the chamber is avoided. These elements comprise part of one wire 10 connecting the filament to one of the cell terminals, upper switch contact 12 connected to the other filament lead, and the other switch contact 13 fixed to diaphragm 4 and connected by a wire 14 to the other cell terminal 15.

In operation, an increase of gas in the chamber 9 due to too high a charging current will raise the diaphragm 4 at least high enough to expose some of the finely porous horizontal section 16 of the lower piece 1, at which time or later the contacts are adjusted to close by turning cover 6 in relation to lower piece 1. The resistance of the light bulb 7 is chosen so that the filament heats to such a temperature as will radiate some light when the switch 12—13 is closed but will not be likely ever to burn out. Its resistance will be an important design variable depending on the capacity of the batteries and the charging rate employed. However, if operation occurs widely different from design conditions and sufficient current on gassing is not shunted to the light bulb 7, the gasses evolved will be safely vented to the atmosphere by the rapidly increasing porous area 16 exposed as the diaphragm is raised.

Figure 2:
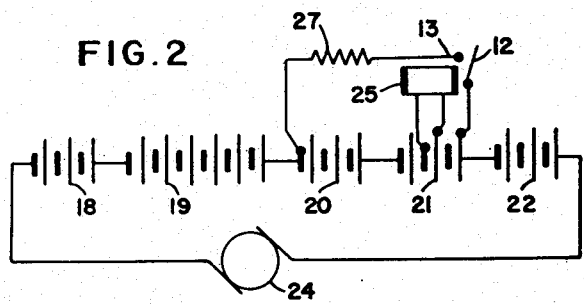
FIGURES 2 and 3 show schematically the single cell control of a multiplicity of cells, all part of a charging series.
Figure 3:
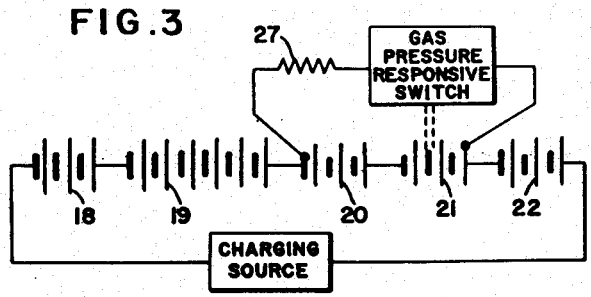

In FIGURE 2, a series of batteries 18, 19, 20, 21, and 22 are being charged by the generator 24. It is desired to protect similar batteries 20 and 21 from gassing because they charge in less ampere-hours due to their construction or because they are less discharged than the other batteries, and it is not desired to limit the charging current through all the batteries to a value that will not gas batteries 20 and 21.

A voltage relay coil 25 is connected to one of the cells of batteries 20 and 21, here shown as the center cell of battery 21. It is well known that the gassing condition occurs simultaneously with the rise to a certain voltage of the cell. Thus the voltage relay is adjusted for the switch contacts 12—13 to close in response to the gassing condition of said representative cell, at which time the power consuming resistor 27 is connected across the two batteries 20 and 21 which comprise part of the series of charging cells. This will lower the voltage across batteries 20 and 21 and therefore across the total of the series, and a larger current will flow through the system and through batteries 18, 19, and 22. Less current will flow through batteries 20 and 21 because of the lowered voltage across them and because of the shunting of current through the power consuming resistor 27. This embodiment is especially suitable for use in a temporary charging arrangement where batteries of various voltages, charges, and capacities are joined in series for just one charge, as it requires only one responding device for no matter how many similar cells, although different resistance values will be used depending on the number.

While the specific embodiments were chosen to illustrate the concordance of as many desirable facets as possible and to teach a specific apparatus of wide utility, there are many uses, particularly for large industrial batteries, which will not require such simplified concordance nor the same selection of features. Alternate mechanisms that are known to those skilled in the art include detection of the gassing condition and switch operation by various gas flow meters and by chemical unison of the gas with temperature switching. Other pressure responsive switches use metal diaphragms, pistons and liquid columns, for example, and venting and safety valving are familiar far beyond the art. Audible indication, or visual indication on a central board may be more suitable at times.

Writing from this point of my invention rather than an embodiment, I claim:

1. The charging circuit including, cells which are to be charged and which are connected together in series relationship, a charging source to which the two ends of said series of cells are connected, a power consuming device connected by a switch to part of said series of cells, and switch closing means responsive to a gassing condition within said part of said series of cells.

2. The charging circuit including, cells which are to be charged and which are connected together in series relationship, a charging source to which the two ends of said series of cells are connected, a power consuming device connected by a switch to part of said series of cells, and switch closing means responsive to a pressure of gas evolved within said part of said series of cells.

3. The charging circuit including, cells which are to be charged and which are connected together in series relationship, a charging source to which the two ends of said series of cells are connected, a power consuming and indicating apparatus connected by a switch to part of said series of cells, and switch closing means responsive to a gassing condition within said part of said series of cells.

4. The charging circuit including, cells which are to be charged and which are connected together in series relationship, a charging source to which the two ends of said series of cells are connected, a power consuming and indicating apparatus connected by a switch to part of said series of cells, and switch closing means responsive to a pressure of gas evolved within said part of said series of cells.

5. The charging circuit claimed in claim 2, in combination with pre-switching gas escape control means and safety venting.

6. The charging circuit claimed in claim 4, in combination with pre-switching gas escape control means and safety venting.

References Cited in the file of this patent
UNITED STATES PATENTS
2,204,101   Fumagali _____ June 11, 1940